United States Patent [19]

Pasternack et al.

[11] 4,249,473

[45] Feb. 10, 1981

[54] WARNING SIGNAL PRODUCING DEVICE FOR PROTECTIVE BREATHING APPARATUS

[75] Inventors: Adalbert Pasternack, Bad Schwartau; Ernst Warncke, Lübeck, both of Fed. Rep. of Germany

[73] Assignee: Drägerwerk Aktiengesellschaft, Fed. Rep. of Germany

[21] Appl. No.: 37,377

[22] Filed: May 9, 1979

[30] Foreign Application Priority Data

Jun. 19, 1978 [DE] Fed. Rep. of Germany ....... 2826787

[51] Int. Cl.[3] ....................... G01L 19/12; F16K 37/00

[52] U.S. Cl. ..................................... 116/70; 116/276; 128/202.22; 137/557

[58] Field of Search ................. 116/70, 266, 268, 269; 128/202

[56] References Cited

U.S. PATENT DOCUMENTS

| | | | |
|---|---|---|---|
| 3,311,125 | 3/1967 | Beasley | 116/268 |
| 3,785,333 | 1/1974 | Warncke et al. | 116/70 |
| 3,870,012 | 3/1975 | Metivier | 116/268 |
| 4,116,156 | 9/1978 | Draxler | 116/70 |
| 4,127,122 | 11/1978 | Kienhufer et al. | 116/70 X |

FOREIGN PATENT DOCUMENTS

| | | | |
|---|---|---|---|
| 1708049 | 3/1975 | Fed. Rep. of Germany | 116/70 |
| 2129529 | 4/1976 | Fed. Rep. of Germany | 116/70 |
| 2456189 | 12/1976 | Fed. Rep. of Germany | 116/70 |

*Primary Examiner*—Daniel M. Yasich
*Attorney, Agent, or Firm*—McGlew and Tuttle

[57] ABSTRACT

A warning device for indicating a reduction of breathing gas supply pressure in an air breathing conduit includes a warning device member disposed in the breathing conduit which has a connection to the gas supply and is movable in response to a drop in the air supply pressure beyond the predetermined amount into at least a partially blocking position so as to increase the flow resistance through the breathing conduit so that the patient using the device is warned by the condition. The device includes a correction element connected to the conduit which moves the warning member in a direction away from the blocking position so that the warning cycle is again initiated.

12 Claims, 4 Drawing Figures

WARNING SIGNAL PRODUCING DEVICE FOR PROTECTIVE BREATHING APPARATUS

BACKGROUND OF THE INVENTION

This invention relates, in general, to respirating devices and, in particular, to a new and useful device for producing warning signals for breathing apparatus using a pressure gas supply.

GENERAL DESCRIPTION OF THE PREFERRED EMBODIMENT

The operating time of protective breathing apparatus with pressure gas supply is determined and, especially, limited by the gas amount stored in the pressure gas containers, such as gas cylinders. That is why protective breathing apparatus are equipped with warning devices cautioning the user of the apparatus if the gas supply amount drops below a predetermined value. These warning devices are operated while utilizing the operating pressure of the supply gas. In order not to shorten the operatng time of the apparatus, the gas is not used for operating the warning devices.

One device of the prior art of this kind provides that upon a pressure drop below a predetermined level in the supply line, pressure gas is directed through a line into a space which is closed by a displaceable piston having an opening and loaded by a spring. The spring is a cup spring which, in the normal position of the piston, closes the opening in the piston by means of a valve disk and, in the other end position, clears the piston. The pressure gas flowing in as the pressure has dropped below a predetermined value, displaces the piston, with the cup spring and the valve disk being taken along. After a certain traveling distance depending on the shape of the cup spring, the valve disk is lifted, so that the pressure gas which has flowed in through the opening in the piston can escape. This causes the gas pressure acting on the piston to break down and the cup spring can again push the piston back into its initial position. This operation is repeated. The chattering noise thereby produced is intended to caution the user that the pressure gas supply runs low. Since the space accommodating the cup spring is connected to the gas line within the breathing apparatus, the breathing gas, even though it is used for breathing too, is consumed in this last phase in a substantially larger amount, so that the overall operating time is reduced. A further disadvantage is the considerable wear to be taken into account, since the impact of both the cup spring and the piston must be hard, to produce the noise (German Pat. No. 1,708,049 dated Mar. 6, 1975).

Another known warning device for protective breathing apparatus with pressure gas supply comprises a signal whistle blowing-off to the outside and supplied with gas in a controlled manner through a displaceable valve body. The valve body is exposed to pressure from two opposite sides, through two pressure gas lines, and provided with a seal which cooperates with a sealing edge and is inserted between one of the pressure lines and the whistle. The pressure surfaces of the valve body are dimensioned to move away from the sealing edge as soon as the gas pressure drops below a predetermined value, and thus to clear the way for supplying gas to the whistle. The compressed gas expands through the whistle threby producing the whistling sound. The pressure acting in the closing direction of the valve returns the valve body into its initial position. The body applies against the seal and the pressure on the side of the valve body turned to the whistle can build up again. The play takes place repeatedly. The amount of gas passing through the whistle is lost for the breathing. Consequently, with a given gas supply, this warning device reduces the operating time. For diving purposes, warning devices with a signal whistle are unusable (German Offenlegunsschrift No.2456 189 dated Aug. 12, 1976.

Still another warning signal-producing device comprises, in advance of the signalling device, a pressure-controlled first valve which is operated by the pressure gas and followed by a pressure controlled second valve which is provided in the line leading to the signalling device. The control means of the second valve is exposed, on one side, to the pressure present in the line leading to the signalling device, while by the other side, a completely enclosed space communicates through a throttle, with this line. As the supply gas pressure drops, the first valve opens and the pressure gas can flow to the signalling device to set it in operation. After a period of time determined by the throttle, the second valve closes and interrupts the flow to the signalling device. This is provided to avoid an excess gas consumption. Nevertheless, the additional pressure gas amount needed for operating the signalling device gets lost for the breathing. The gas blown by the signalling device to the outside does not allow a use in a diving apparatus (German Pat. No. 2,129,529 dated Mar. 4, 1976).

SUMMARY OF THE INVENTION

The invention is directed to a warning signal producing device becoming effective as the supply gas pressure drops to a residual pressure, and which is useable for any protective breathing apparatus with pressure gas supply and requires only a small amount of the gas for the warning action, which amount is not lost for the breathing circuit.

In accordance with the invention, a warning device for indicating a reduction of the breathing gas supply pressure includes a warning member located in the breathing air line which has a connection to the gas supply and is movable in response to a drop in the gas supply pressure beyond a predetermined amount into a position at which it least partially blocks the air flow or increases the flow resistance sufficiently to produce a warning to the person using the device.

The apparatus advantageously includes a warning piston which is biased by a spring into a position in which it closes off the breathing air flow. The warning piston is under the influence of pressure from a low pressure supply which is admitted through a throttle which is controlled by the pressure of the supply gas line. The device also advantageously includes a correction member in the form of a valve piston which is movable by the pressure changes to vent the space behind the warning piston and permit it to move in a direction to open up the air conduit once again.

Due to the accommodation of the warning device in the conduit conveying the breathing air, no portion of the gas used for the warning is blown off. The increased resistance to breathing is perceived by the user already during the next respiration. Consequently, the amount of gas employed for producing the warning signal itself is exceedingly small. By utilizing the increased resistance to flow in the air conduit conveying the breathing air as a warning signal, it is made sure with absolute safety that the warning signal will be perceived. This is an extraordinary advantage over an acoustic warning, since an acoustic warning may be suppressed by the ambient conditions.

The warning device according to an embodiment in which it comprises a spring-loaded valve ppiston and a bellows-loaded warning piston, the device closes the air conduit and, due to the pressure release in the pressure line and by means of the springs, straightway starts the reopening of the air conduit, that is the returning motion of the two pistons into their initial positions, to immediately begin a new closing of the air conduit as these initial positions are reached. The pumping action thereby produced and constituting the warning signal is perceived by the user as an enormous increase and release again in the resistance to breathing. The additional pressure gas consumption is extremely small.

The warning devices of the other embodiments solving the same problem are equally simple in design and reliable in operation. This is made clear by the specification and the drawings.

Accordingly, it is an object of the invention to provide a warning signals producing device for breathing apparatus having a pressure gas supply which comprises an air conduit for breathing air and includes a first valve controlled by the pressure of the supplied gas and a second valve which is also pressure-controlled and has a control diaphragm which has one side exposed to the pressure gas supply and has an opposite side in an enclosed space with a throttle connection with the gas supply and which also includes a warning device member mounted in the air conduit and connected to the space which is movable in response to a pressure in the space to vary the resistance to flow in the air conduit and thereby produce warning signals.

A further object of the invention is to provide a warning device for indicating variations of breathing gas supply pressure and a breathing line or conduit which comprises a warning device including a warning device member disposed in the breathing air conduit which has a connection to the gas supply and is movable in response to changes in the gas supply pressure beyond a predetermined amount into at least a partially blocking position so as to increase the flow resistance in the breathing conduit and produce a warning by the increased resistance and which further includes correction means connected to the conduit and responsive to the warning device to move the member in a direction away from the blocking position.

It is still a further object of the invention to provide a warning device for indicating a reduction of breathing gas beyond a predetermined level in an air breathing device having a pressure gas supply which includes an air conduit having a bore extending therethrough for the passage of breathing air from an entrance end to an exit end and a control device operatively connected to the pressure gas supply. A pressure line extends from the control device and terminates in the bore of the air conduit. The control device includes a passage means for establishing fluid communication between the pressure gas supply and the pressure line. A first valve mounted in the control device is operative to open the passage means to establish the fluid communication responsive to the reduction of breathing gas. A second valve is mounted in the control device and is operative to alternately open and close the passage means and to vary the pressure in the pressure line. A warning means or device is operatively connected to the pressure line in the bore and is movable, in response to a gas supply pressure in the pressure line, into at least a partially exit blocking position in the air conduit so as to vary the pressure thereof as an indication to the user of the reduction in breathing air.

A further object of the invention is to provide a warning device for breathing apparatus which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
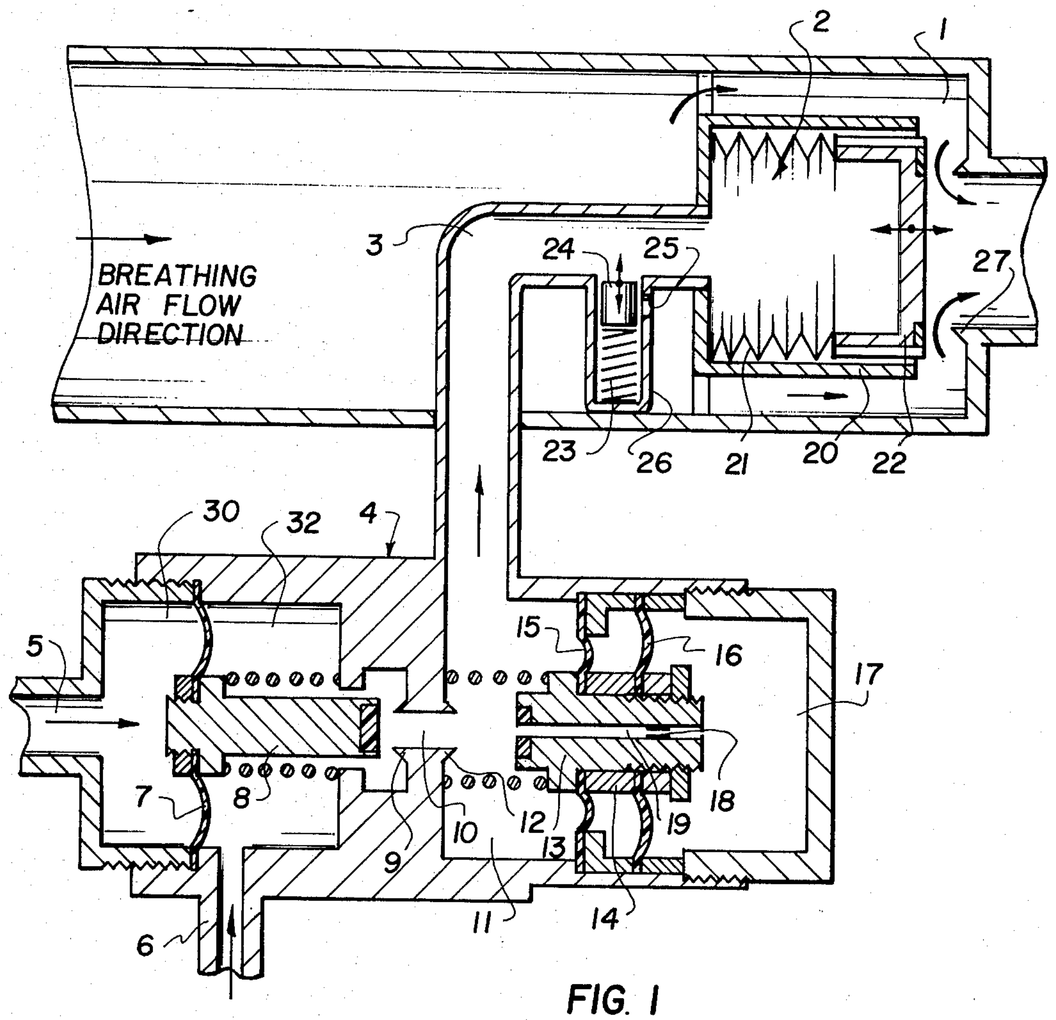
FIG. 1 is a sectional view of a breathing conduit of a breathing apparatus having a pressure gas warning system constructed in accordance with the invention.

Refering to the drawings, in particular, the invention embodied therein, as shown in FIG. 1, comprises a warning signals producing device generally designated 2 for indicating changes of breathing gas supply for the operation of a respirator which includes a breathing air conduit 1 through which the breathing air is directed. In accordance with the invention, the warning device 2 includes a member in the form of a piston 22 which is disposed in the breathing air conduit 1 and has a connection in the form of a pressure line 3 to a gas supply. The piston 22 is movable in response to a drop in the gas supply pressure beyond a predetermined amount into at least a partially blocking position so as to increase the flow resistance of the breathing air so as to provide a warning to the user that the pressure gas supply is changing, for example, dropping. The warning device also includes a correction member in the form of a valve piston 24 which moves during the production of a pressure signal so as to vent the pressure line to permit the warning piston to move backwardly into a position in which it no longer blocks the air flow, at least to the same degree. This produces a situation in which the pressure conditions again build up so that the warning piston again moves to at least partially block the air stream and produce a further warning signal.

The warning signals producing device further includes a control device generally designated 4 which is connected to the air conduit 1 through a pressure line 3. The control device 4 comprises a housing having a first valve 8 which is controlled, through a diaphragm 7, by the differential pressure resulting from the actual supply gas pressure in a gas cylinder space 30 applied to a supply gas line or connection 5, and the low pressure in cylinder space 32 of the gas supply applied to a low gas pressure gas supply connection 6. As soon as the pressure in the gas cylinder space 30 drops to the provided residual pressure, first valve 8 opens at a crater-like mouth 9, and clears a passage 10 to pressure line 3. Pressure line 3 begins in a space 11. This space 11 accommodates a second valve 13 cooperating with a crater-like mouth 12 at passage 10. A valve body 14 of the second valve 13 is suspended from two diaphragms 15 and 16, thereby forming another enclosed space 17 which is separated from space 11. The two spaces 11 and 17 communicate with each other through a bore 19 provided with a throttle 18. In its normal position, second valve 13 s open, so that the pressure gas can flow through the pressure line 3 to the warning device 2. After a closing pressure resulting from the unequal surface areas of the two diaphragms 15 and 16 has been attained, second valve 13 closes by applying against crater-like mouth 12. Thereby, the warning process started with the opening of first valve 8 is terminated.

Warnng device 2 comprises a piston 22 which is guided in a cylinder 20 and moved by a spring bellows 21 and exposed to the pressure in the pressure line 3, and a valve piston 24 which also is exposed to this pressure and biased, in the direction opposite to the pressure, by a spring 23. A vent 25 provides communication between the guide cylinder 26 and the interior of air conduit 1. Warning piston 22 applies with a corresponding pressure against a crater-like mouth 27 surrounding at the inside air conduit 1. The resiliences of spring 23 and spring bellows 21 are dimensioned to balance each other to the effect that as piston 22 applies against mouth 27, thus air conduit 1 is closed for the passage of breathing air, valve, piston 24 just clears the vent 25. Upon clearing the vent, the pressure in pressure line 3 drops, and piston 22 and valve piston 24 are returned into their initial positions by the spring forces. In those initial positions, the pressure instantly beings to build up again, etc. These cycles produce a pumping action which is perceived by the user as an increase and decrease of the resistance to breathing.

Figure 2:
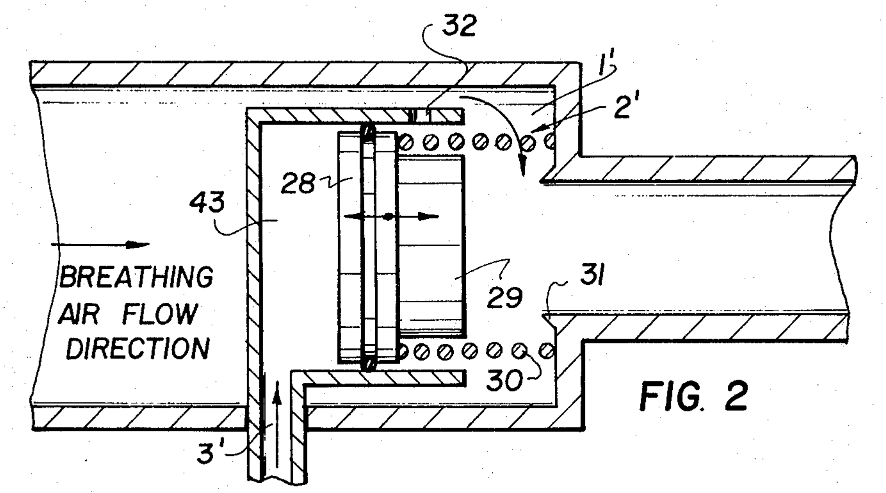
FIG. 2 is a view similar to FIG. 1 of another embodiment of the invention.

FIG. 2 shows another embodiment of warning devices 2', similar to the warning device 2, but in which the functions of valve piston 24 and warning piston 22 of FIG. 1 are combined. The gas pressure in pressure line 3' and space 43 displaces piston 29 against the action of a spring 30, to close air conduit 1' by moving into a crater-like mouth 31. A vent 32 causes a pressure drop, whereby the next phase of the warning cycle is started.

Figure 3:
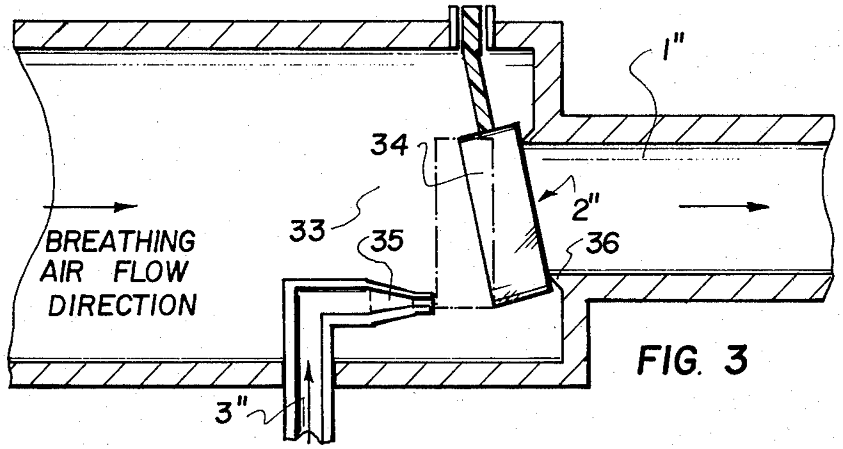
FIGS. 3 and 4 are views similar to FIG. 1 of still other embodiments of the invention.

The warning device 2'' shown in FIG. 3 comprises an oscillating member 34 which is suspended in air conduit 1'' and closes, in its rest position, the outlet of pressure line 3'' which is designed as a nozzle 35. As the pressure in pressure line 3'' rises, member 34 starts performing oscillating motions during which it periodically applies against mouth 36. These oscillating motions are warning signals which are perceptible by the user, since they vary the resistance to the breathing air flow.

Figure 4:
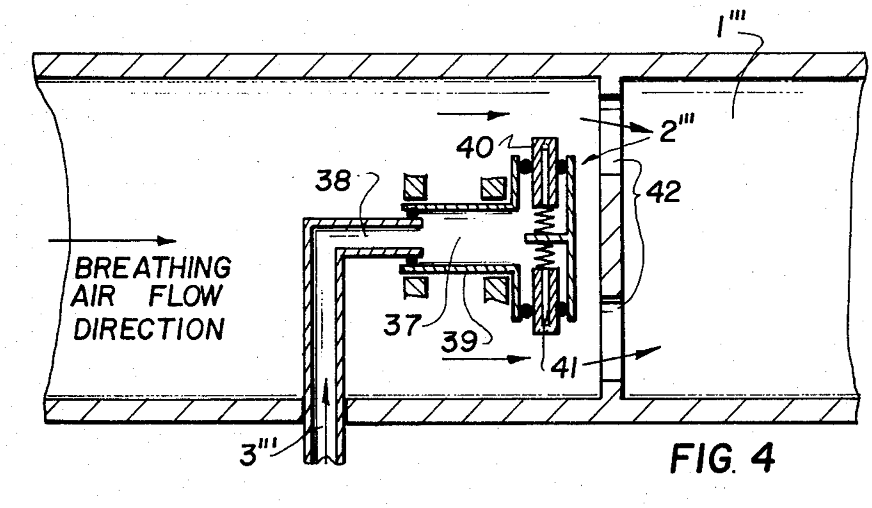

The warning device 37 of FIG. 4 is a rotary mechanism which is driven by the gas pressure in line 3''' and performs a rotary motion about the end portion 38 of this line. The device 37 comprises warning plates 40 which are mounted in rotary body 39 for outward displacement under the centrifugal force and are spring-loaded in the direction perpendicular to the axis of rotation. Due to this misplacement, the cross-sectional areas of passage 42 for the breathing gas in air conduit 1''' are reduced. The rotation is caused by the gas flowing out through blow-out apertures 41 provided in warning plates 40.

While specific embodiments of the invention have been shown and described in detail to illustrate the application of the principles of the invention, it will be understood that the invention may be embodied otherwise without departing from such principles.

What is claimed is:

1. A warning device for indicating a reduction of breathing gas beyond a predetermined level in an air breathing device having a pressure gas supply comprising an air conduit having a bore extending therethrough for the passage of breathing air from an entrance end to an exit end, a control device operatively connected to said pressure gas supply, a pressure line extending from said control device and terminating in said bore of said air conduit, said control device including a passage means for selectively establishing fluid communication between the pressure gas supply and the pressure line, a first valve mounted in said control device operative to open said passage means to establish said fluid communication responsive to the reduction of breathing gas and a second valve member in said control device being operative to alternately open and close said passage means and vary the pressure in said pressure line, and warning means operatively connected to said pressure line in said bore and being movable in response to a gas supply pressure in said pressure line into at least a partially exit end blocking position in said air conduit so as to vary the pressure thereof in an oscillating manner to signal as the warning to the user of the reduction of the breathing gas.

2. A warning device according to claim 1, wherein said warning means comprises a spring-loaded piston having one side connected to said pressure line, said air conduit having a reduced diameter conduit portion with a mouth facing said spring-loaded piston, said piston being movable to said mouth to close off the flow through said small diameter portion, said warning means also including a valve piston, said valve piston then being movable in response to an increase in pressure in said pressure line to vent said pressure line.

3. A warning device according to claim 1, wherein said warning means comprises an oscillating part, said pressure line including a nozzle directed against said oscillating part, said oscillating part being shiftable in accordance with the pressure from said pressure line between a position closing off a portion of said pressure line to a position opening said pressure line and located adjacent said nozzle.

4. A warning device according to claim 1, wherein said warning means comprises a rotatable member having nozzle elements discharging radially and connected to said pressure line, said nozzle elements being expandable during increase in pressure to partially block the air stream in said air conduit.

5. A warning device according to claim 1 wherein said conduit includes a large diameter portion and a small diameter portion connected to said large diameter portion, an oscillating member mounted in said large diameter portion and being oscillatable to block at least a portion of said small diameter portion and said pressure line connected to the gas supply pressure and having a nozzle directed toward said oscillating member to direct said oscillating member to a position blocking said small diameter portion of said conduit.

6. A warning device according to claim 1, wherein, said warning means includes a rotatable member adapted to be connected to the pressure line having at least one radially extending portion terminating in a discharge nozzle, said discharge nozzle being extendable radially outwardly during rotation thereof and effective to block a portion of the air flow.

7. A device according to claim 1, wherein said warning means is mounted to said conduit for oscillation, said pressure gas line comprising a nozzle directed against said warning member to urge it to a position to increase the resistance in the breathing gas line.

8. A warning device according to claim 1, wherein said warning means comprises a rotatable member rotatably mounted at the end of said pressure line and having a portion which extends radially during rotation to block off a portion of the flow of the breathing line.

9. A warning device according to claim 1 wherein said warning means comprises a spring-loaded valve piston and a bellows-loaded warning piston, each of said pistons being movable in response to pressure in said closed space, said valve piston being movable to a position at which it vents the the pressure line, said warning piston being movable to close off a portion of said breathing line.

10. A warning device according to claim 1, including correction means adapted to be connected to the gas supply and to said warning means and effective to move said warning means in a direction away from the blocking position after it has been in the blocking position for a predetermined amount of time.

11. A warning device according to claim 1, wherein said warning means comprises a piston, said air conduit including a large diameter conduit portion and a small diameter conduit portion, said piston being movable from said large diameter portion into said small diameter portion to substantially block the passage of breathing air therethrough, said pressure line being connected to said piston on the side thereof opposite to said small diameter conduit and being effective by pressure variations to move said warning piston into said conduit, and a valve piston connected to said pressure line including a valve member movable by variations in pressure and a vent uncoverable by said valve member for venting the space connected to said piston.

12. A warning device according to claim 1, wherein said breathing line includes a small diameter portion connected to a larger diameter portion, said warning means comprising a piston movable in said larger diameter portion and having a part engageable in said small diameter portion to block off said small diameter portion and including a vent openable by said movement of said piston into said small diameter portion to relieve the pressure in the connection to the gas supply and permit said piston to move backwardly out of said small diameter portion.

* * * * *